July 4, 1950  C. L. TUBBS  2,513,692
VAPOR ENGINE DRIVEN BY EXPANSION
AND CONTRACTION OF VAPOR Filed July 7, 1947  2 Sheets-Sheet 1

Inventor
Charles L. Tubbs
By Alfred W. Knight
Attorney

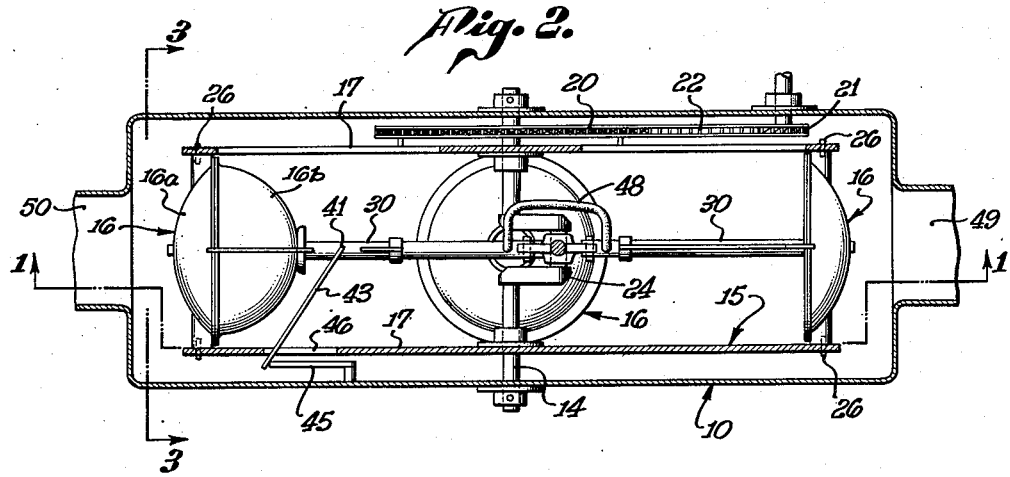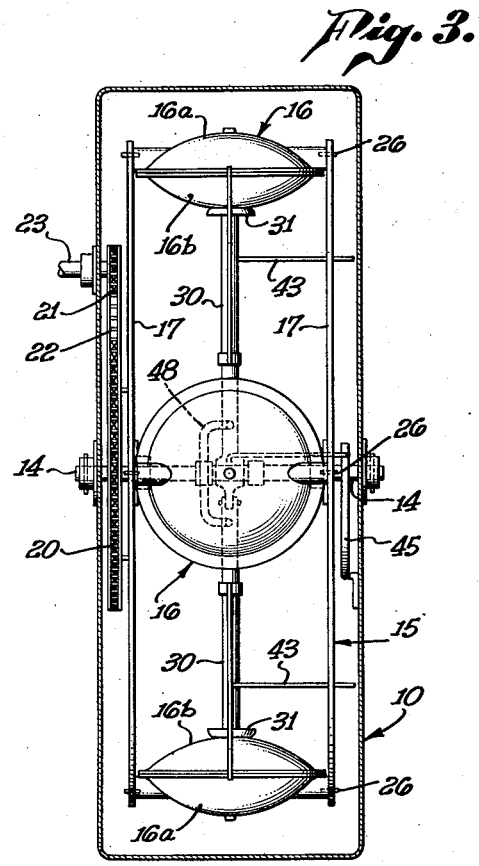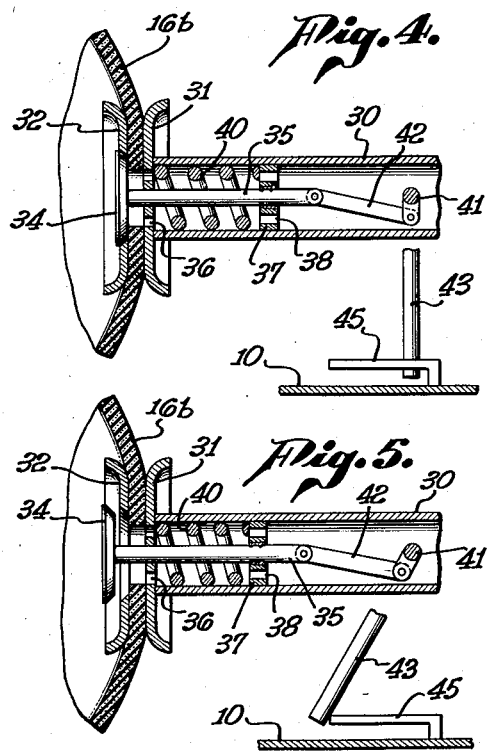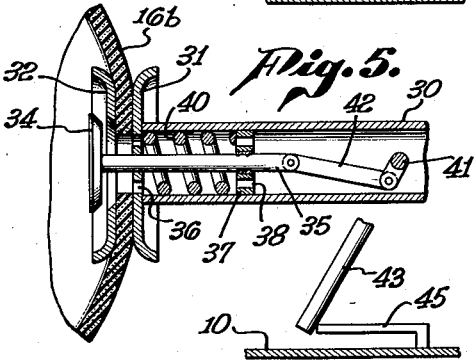

Patented July 4, 1950

2,513,692

UNITED STATES PATENT OFFICE 2,513,692

VAPOR ENGINE DRIVEN BY EXPANSION AND CONTRACTION OF VAPOR

Charles L. Tubbs, Los Angeles, Calif.

Application July 7, 1947, Serial No. 759,354

6 Claims. (Cl. 60—25)

1

The present invention relates generally to vapor engines, and more especially to an engine of that character in which power is derived from the alternate expansion and contraction of a fluid medium which characteristically is a liquid that can be vaporized and condensed at relatively low temperatures.

There are around us constantly, or can be made available, sources of large amounts of energy at relatively low temperatures. Examples of this are water from subterranean hot springs or water heated by solar heating devices. Utilization of energy from these sources has not been considered economical because of their relatively low temperatures provide only a small temperature differential which can be used to extract the available energy. A compensating feature is the cheapness of such water since the heat energy is originally derived from a natural source.

Hence it is a general object of my invention to device a motor or engine adapted to operate within relatively narrow limits of temperatures and to extract energy from relatively low temperature sources, as those named.

It is also an object of my invention to devise a vapor engine which is relatively simple and easy to construct, operate and maintain.

These and other objects of my invention have been attained in a vapor engine constructed according to my invention by providing a rotatably mounted frame with a plurality of expansion chambers which are adapted, by rotation of the frame, to be alternately immersed in and withdrawn from a fluid medium which is a source of heat. This fluid medium will ordinarily be heated water. Within each expansion chamber is a quantity of a relatively volatile liquid which vaporizes at a temperature below that of the surrounding fluid medium.

A connecting rod extends between each expansion chamber and a fixed crank or the like mounted eccentrically with respect to the axis of rotation of the frame; and the rods are adapted to cause rotation of the frame upon expansion of the chambers in succession as a result of vaporization of the liquid therein. After an expansion chamber is removed from the fluid medium from which it absorbs heat, it then rejects heat to the surrounding atmosphere and the fluid within the chamber is thereby at least partly condensed, thus contracting the expansion chamber preparatory to repeating the complete cycle.

How the above objects and advantages of my invention, as well as others not specifically mentioned, are attained will be more readily understood by reference to the following description and to the annexed drawings, in which:

Fig. 2 is a horizontal section on line 2—2 of Fig. 1 with the chambers shown in elevation;

Fig. 3 is a vertical transverse section on line 3—3 of Fig. 2, showing the frame and expansion chambers in elevation;

Fig. 4 is a fragmentary section through the base of an expansion chamber showing the attachment thereto of the connecting rod and exhaust valve;

Fig. 5 is a view similar to Fig. 4 showing the valve in open position as a result of engagement with the valve operating cam;

Figure 1:
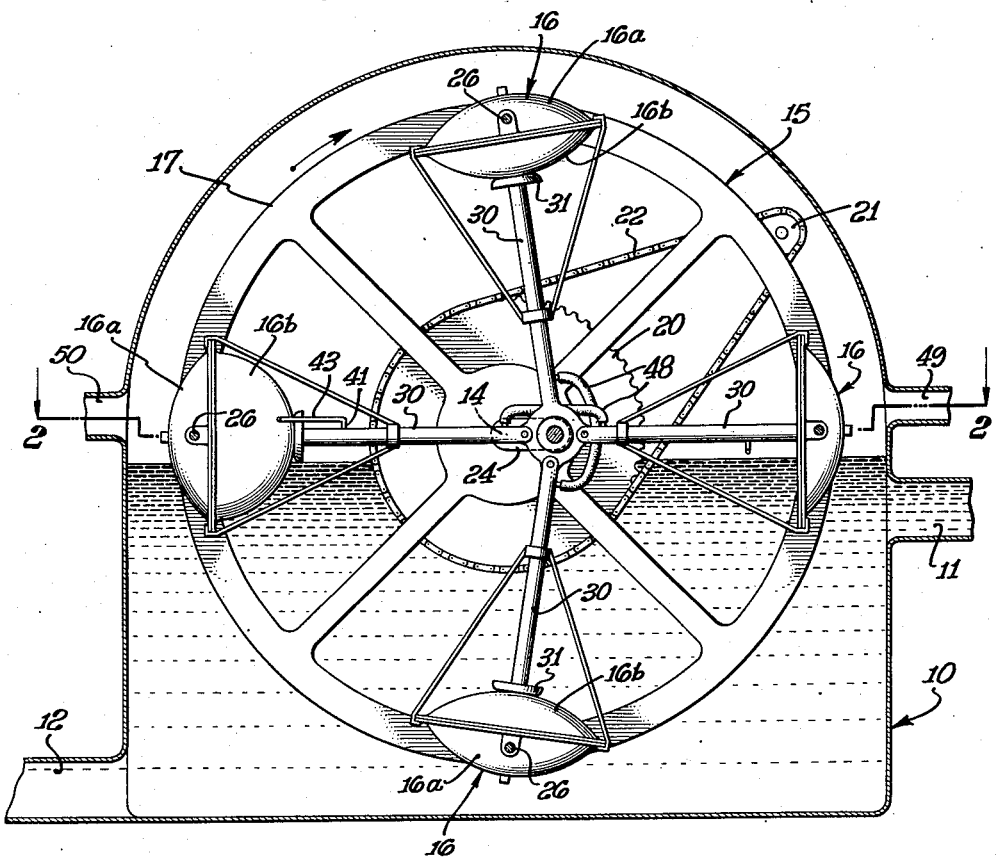
Fig. 1 is a vertical section through a vapor engine constructed according to my invention, taken on line 1—1 of Fig. 2.

There is indicated generally at 10 a tank containing a fluid medium capable of being a source of heat. Typically this fluid is water which has been either heated naturally or by some suitable means, so that the temperature of the heating medium in this case is below the boiling point of water. A stream of water is maintained through tank 10 from inlet 11 to outlet 12 so that the temperature within the tank may be maintained at a satisfactory level.

Mounted on the side walls of tank 10 is a fixed shaft 14 upon which is rotatably mounted circular frame 15. Frame 15 is composed generally of two circular end plates or spiders 17, and a plurality of expansion chambers 16 which are supported by and between the spiders near their peripheries. I have here shown the frame as carrying four expansion chambers 16 spaced 90° apart around the frame; but it will be understood that my invention is not limited to any particular number of expansion chambers, and as will be pointed out later, a larger number may likewise be used. Four expansion chambers is considered to be probably the practical minimum number, but for a frame of given dimensions, the amount of power generated is approximately proportional to the number of expansion chambers.

At one side of frame 15 is fastened sprocket 20 which rotates with the frame and drives pinion 21 by means of chain 22. Pinion 21 is mounted upon a shaft 23 which is connected to any suitable device to be driven by the vapor engine. The sprocket and chain drive is a simple means of transmitting power from the rotating frame 15; but it will be realized that any other suitable means may be used.

Shaft 14 is provided with a single crank 24 which is held fixed in place. As will become apparent from the following description, any other suitable construction may be used which also provides a fixed pin or bearing similar to crank 24 at a location eccentric to the axis of shaft 14 which is the axis of rotation of frame 15.

Each expansion chamber 16 comprises a rigid member 16a which is preferably made of metal in the shape of a dome which is outwardly convex, and a flexible elastic member 16b disposed radially inwardly of the rigid member. The two members 16a and 16b are fastened together around their margins, which are here shown as being circular, although I am not limited to any particular shape, to form between them the expansion chamber. The expansion chamber is connected to the spiders of frame 15 by means of pivot pins 26 passing through the frame and into suitable lugs on the rigid member of the expansion chamber.

Extending between each expansion chamber and crank 24 is a connecting rod 30. This connecting rod is preferably hollow in order to provide a vapor passage from the expansion chamber, as will be further explained. At its outer end, the connecting rod 30 is attached to the flexible member 16b of the expansion chamber in the manner shown in Fig. 4. The flexible wall of the expansion chamber is clamped between two metal plates 31 and 32. The inside plate 32 has an opening, registering with an opening in member 16b, the rim of which provides a seat for poppet valve 34. The outside plate 31 has an opening which is a guide for valve stem 35 and other openings at 36 for the passage of vapor. The other end of valve stem 35 is held in a guide 37 which is also provided with other holes 38 for the passage of vapor.

Compression spring 40, held between plate 31 and guide 37, biases or loads valve 34 so that it is normally in the closed position shown in Fig. 4. Means for moving valve 34 to the open position includes shaft 41 rotatably mounted in connecting rod 30 and provided with a crank attached by means of link 42 to the end of valve stem 35. Shaft 41 has a long arm 43 which, when valve 34 is closed, extends approximately perpendicular to the connecting rod to engage fixed cam 45 fastened to the side wall of tank 10 as shown in Figs. 2 and 4. Rotation of frame 15 in a clockwise direction, as viewed in Fig. 1, causes the outer end of arm 43 to engage cam 45 and to be moved radially outward of connecting rod 30 as the arm moves over the cam. This motion of arm 43 rotates shaft 41 in a clockwise direction as viewed in Fig. 4 to move valve 34 against spring 40 to the open position shown in Fig. 5.

I have shown in Fig. 2 means for guiding and supporting the outer end of arm 43 in order to improve operation of the arm by engagement with cam 45. For this purpose, I provide a slot 46 in a spoke of one spider 17. Arm 43 projects through the slot with a loose fit and is movable radially along the slot. It will be noted that in Fig. 1 the spokes of the spider 17 shown therein are not positioned to serve as guides for these valve-operating arms. However, I rotate the other spider, which is the right-hand one shown in Fig. 3, through an angle of 45° with respect to the spider shown in Fig. 1, to bring the spokes opposite the valve-operating arms.

Although other constructions may be used, I prefer to provide a master connecting rod extending between one expansion chamber and crank 24, and secondary connecting rods extending between each of the other expansion chambers and their pivotal connection to the master rod. This construction is shown in Fig. 1. The master connecting rod extends to the expansion chamber 16 now at the top. Generally speaking, the maximum possible movement of each rod should be used, as this permits the greatest eccentricity of crank 24 and the most efficient operation.

The major portion of each connecting rod 30 is hollow, in order that the interior may be used as a vapor passage and thus eliminate the need for a separate conduit. Each two diametrically opposed connecting rods are connected by a flexible tubing 48 so that a vapor passage extends entirely between each pair of diametrically opposed expansion chambers 16.

The volatile liquid in each of the expansion chambers may be any one of a number of suitable liquids which vaporize at a temperature below the temperature of the heating medium in tank 10. As typical of such liquids deemed suitable are butane ($C_4H_{10}$) or difluorodichloromethane ($CCl_2F_2$). The quantity of liquid in each expansion chamber need be only a small fraction of the minimum volume of the chamber since the vapor will expand to many times the volume it occupies as a liquid. On the other hand, it is not contemplated that ordinarily all the liquid in the expansion chamber will vaporize at each period of heating.

It is not necessary that a temperature below the boiling point of the liquid be reached in the expansion chamber during the cooling cycle, since an adequate expansion and contraction of the chamber can be obtained by a change in vapor pressure without condensation.

Having described the construction of my vapor engine, I shall now describe briefly its mode of operation. As the frame rotates in a clockwise direction, as viewed in Fig. 1, the right-hand expansion chamber enters the heated water. Continued rotation of the frame moves the expansion chamber through the water and it occupies successively the positions shown at the bottom and the left-hand side of the frame. During this travel heat is transmitted through the metallic portion 16a of the expansion chamber to the volatile liquid inside, at least a portion of which vaporizes and expands. The increase in vapor pressure causes the expansion chamber to expand, forcing connecting rod 30 inwardly with respect to the chamber. The increase in volume of the expansion chamber is accomplished by movement of flexible member 16b of the chamber. This radially inward movement of the connecting rod causes frame 15 to rotate.

The maximum amount of heat absorption and consequently the maximum expansion of the chamber is reached as the chamber approaches the position of the left-hand chamber in Fig. 1. As the chamber approaches this position, cam 45 and arm 43 engage to open valve 34. When the valve opens, the pressure in the expansion chamber is rapidly reduced since the vapor under pressure then escapes past valve 34 and through the passage means formed by the connecting rod, the associated tubing 48, and the diametrically opposed connecting rod. The gas pressure within the opposite connecting rod builds up sufficiently that it overcomes the force of spring 40 and opens the associated valve 34, to allow vapor to flow into the expansion chamber which is just entering the heated water. In this manner, the pressure in a heated and expanded chamber is rapidly reduced, thus allowing the chamber to contract, and the vapor is transferred to another chamber which has been cooled and contracted. The opening of valve 34 marks the end of the expansion period of the heated chamber and cam 45 is so positioned that this occurs as the chamber emerges from the heated water.

Rotation of frame 15 is caused in part by the force exerted on each connecting rod 30 in succession in the manner described. But there is another force which also aids in causing rotation of frame 15 and that is the increase in buoyancy of each expansion chamber as it is heated and increases in volume. For this reason the ratio between the maximum and minimum volumes of the expansion chamber should be relatively great, and it is contemplated will exceed a ratio of 3 to 1.

As each expansion chamber emerges from the water in tank 10, the cooling part of its cycle commences, and occupies approximately one-half of each revolution of frame 15. The expansion chamber is cooled by the evaporation of the water on the outside of the expansion chamber as the chamber moves around from the left-hand side to the right-hand side of the frame as viewed in Fig. 1. Any other suitable means for cooling each expansion chamber in succession may be provided. In relatively dry climates, it may be entirely sufficient to simply expose the expansion chamber to the open atmosphere. Under other circumstances it may be desired to have air pass through the upper part of tank 10 under forced draft. Provision is made for this in the drawings by extending the walls of tank 10 over the frame 15 and providing an air inlet 49 and outlet 50 at opposite sides of the tank.

Figure 6:
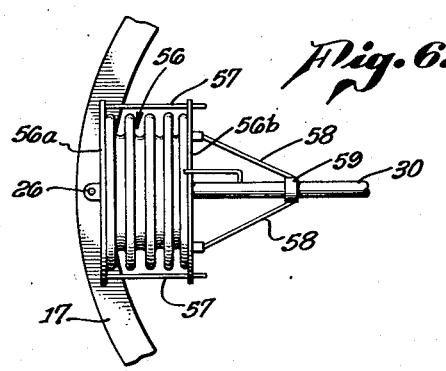
Fig. 6 is a fragmentary view showing in elevation a variational form of expansion chamber.

In general, the greater the wall area of each expansion chamber through which heat can be transferred, the greater the quantity of liquid vaporized. In accord with this principle it may be desirable to provide an expansion chamber which has substantially all of its wall area formed of a highly conductive material, such as metal. A variational form of expansion chamber 56 is shown in Fig. 6 in which the expansion chamber is formed within a metallic bellows which is attached at either end to rigid plates 56a and 56b. The head plate 56a is attached to frame 15 by means of pivot pins 26 in the manner already described.

Plate 56a also has a plurality of guide rods 57 which slide through guide openings in plate 56b. Attached to the plate 56b are angle braces 58 attached at their other ends to guide sleeve 59 through which connecting rod 30 is free to slide. This arrangement permits the necessary angular change in position of connecting rod 30 without putting any undue load upon metallic bellows 56. The other portions of the vapor engine are constructed in the manner previously described.

My invention is not necessarily limited to an engine utilizing only four expansion chambers, and a larger number such as six, eight, or more, may be used. With this larger number, the expansion chambers can be arranged in pairs with the two members of each pair diametrically opposite each other as in Fig. 1, so that the cooler chamber of the pair receives vapor from a heated chamber which is located 180° around the circular frame.

Figure 7:
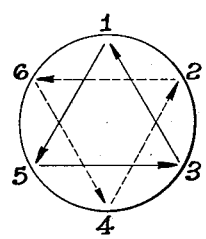
Fig. 7 is a diagram of a variational arrangement of vapor passages.

It is also possible to so connect the chambers that the cooler chamber, receiving vapor from a heated chamber, follows the heated chamber by less than 180°. Fig. 7 shows diagrammatically the arrangement of the vapor passages interconnecting the expansion chambers when there are six chambers. If the chambers are assigned numbers in sequence clockwise, then one group of three chambers is connected so that vapor flows from 5 to 3 to 1 and back to 5, as shown by the solid arrows. The remaining three chambers are connected by another series of pasages so that vapor flows from 2 to 6 to 4 and back to 2 as shown by the dotted arrows.

This type of arrangement requires two valves, an inlet valve and an outlet valve, in each expansion chamber. It is believed to be clear without further illustration that these valves may be essentially the same as the single valve described. The exhaust valve may be constructed and operated in the same manner as valve 34 shown in Figs. 4 and 5. The inlet valve may be a spring-loaded valve the same as valve 34 but without any valve-opening mechanism, such as arm 43 and cam 45. The inlet valve opens in response to the greater vapor pressure in the passage. Both valves are urged toward closed position by the increase in vapor pressure within the chamber during the transfer of heat thereto.

Having described a preferred form of my invention and certain modifications thereof, it will be evident that various changes therein may be made by persons skilled in the art without departing from the spirit and scope of my invention; and consequently I wish it understood that the foregoing description is considered as being illustrative of, rather than limitative upon, the appended claims.

I claim:

1. In a vapor engine, the combination comprising: a heat source; a rotatably mounted frame; a plurality of expansion chambers on the frame and adapted to be moved into and away from a heat receiving position with respect to said heat source by rotation of the frame, each chamber containing a relatively volatile liquid; a fixed crank shaft; a connecting rod extending between each expansion chamber and the crank shaft to cause rotation of the frame upon expansion of the chamber when the volatile liquid therein is heated; passage means extending from each expansion chamber to a second expansion chamber to conduct vapor from a heated chamber to a cooled chamber; valve means in each passage means controlling vapor flow therethrough; and valve operating means operable to open the valve means at a predetermined location in the path of travel of each expansion chamber.

2. A vapor engine as in claim 1 in which the passage means comprises a hollow section in each of two connecting rods attached one to each of the two expansion chambers and a flexible tubing interconnecting the two connecting rod sections.

3. A vapor engine as in claim 1 in which the two chambers connected by said passage means are at diametrically opposed positions on the frame.

4. A vapor engine as in claim 1 in which the two chambers connected by said passage means are at such positions on the frame that the cooler one to which vapor is conducted follows the heated chamber by less than 180°.

5. In a vapor engine, the combination comprising: a heat source; a rotatably mounted frame; a plurality of expansion chambers on the frame and adapted to be moved into and away from a heat receiving position with respect to said heat source by rotation of the frame, each chamber containing a relatively volatile liquid; a fixed crank shaft; a connecting rod extending between each expansion chamber and the crank shaft to cause rotation of the frame upon expansion of the chamber when the volatile liquid therein is heated; passage means extending from each expansion chamber to a diametrically opposed expansion chamber to conduct vapor from a heated chamber to a cooled chamber; valve means at each chamber controlling flow of vapor from the chamber into the passage, said valve means being spring-loaded to permit vapor to flow into a chamber when the pressure in the passage exceeds the chamber pressure; and valve operating means operable to open the valve means when the associated expansion chamber is closely approaching the point of maximum expansion.

6. In a vapor engine, the combination comprising: a rotatably mounted frame; a plurality of expansion chambers on the frame each containing a quantity of a relatively volatile liquid; a fixed crankshaft; a connecting rod extending between each expansion chamber and the crankshaft; and means for alternately and repeatedly heating and cooling each expansion chamber in succession to cause the liquid therein to vaporize and condense whereby the frame is rotated; and means for transferring vapor and liquid from a heated expanded chamber to a cooled contracted chamber at the end of the expansion period of the heated chamber to rapidly reduce the pressure in the heated chamber.

CHARLES L. TUBBS.

REFERENCES CITED

The following references are of record in the file of this patent:

UNITED STATES PATENTS

| Number | Name | Date |
|---|---|---|
| 534,871 | French | Feb. 26, 1895 |
| 1,469,729 | Myers | Oct. 2, 1923 |
| 2,255,943 | Sarver | Sept. 16, 1941 |

FOREIGN PATENTS

| Number | Country | Date |
|---|---|---|
| 591,725 | France | Apr. 16, 1925 |